United States Patent
Chow et al.

(10) Patent No.: US 10,053,551 B2
(45) Date of Patent: Aug. 21, 2018

(54) ETHYLENE-VINYLALCOHOL RESIN COMPOSITION, MOLDED PRODUCT, AND MULTILAYER STRUCTURE

(71) Applicant: KURARAY CO., LTD., Kurashiki-shi (JP)

(72) Inventors: Edgard Chow, Houston, TX (US); Wataru Hirose, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/305,803

(22) PCT Filed: Apr. 24, 2015

(86) PCT No.: PCT/JP2015/062482
§ 371 (c)(1),
(2) Date: Oct. 21, 2016

(87) PCT Pub. No.: WO2015/163437
PCT Pub. Date: Oct. 29, 2015

(65) Prior Publication Data
US 2017/0044350 A1 Feb. 16, 2017

Related U.S. Application Data

(60) Provisional application No. 61/984,358, filed on Apr. 25, 2014.

(51) Int. Cl.
*C08K 5/053* (2006.01)
*B32B 27/30* (2006.01)
*C08L 23/08* (2006.01)

(52) U.S. Cl.
CPC ............ *C08K 5/053* (2013.01); *B32B 27/306* (2013.01); *C08L 23/0861* (2013.01)

(58) Field of Classification Search
CPC .......... C08K 5/05; C08K 5/053; B32B 27/28; B32B 27/306; C08L 29/04
See application file for complete search history.

(56) References Cited

U.S. PATENT DOCUMENTS

| 5,384,187 A | 1/1995 | Uemura et al. |
| 5,412,005 A * | 5/1995 | Bastioli ................. A61L 15/225 |
| | | 524/366 |
| 6,352,785 B1 | 3/2002 | Hanada et al. |
| 2002/0037946 A1 | 3/2002 | Isozaki et al. |
| 2004/0053063 A1* | 3/2004 | Porter ....................... B32B 7/12 |
| | | 428/474.7 |

FOREIGN PATENT DOCUMENTS

| EP | 0 539 604 A1 | 5/1993 |
| EP | 2 286 658 A2 | 2/2011 |
| JP | 1-204738 A | 8/1989 |
| JP | 5-51483 A | 3/1993 |
| JP | 8-151469 A | 6/1996 |
| JP | 2000-117872 A | 4/2000 |
| JP | 2001-288321 A | 10/2001 |
| JP | 2002-53727 A | 2/2002 |
| JP | 2003-277566 A | 10/2003 |
| JP | 2004-155922 A | 6/2004 |
| WO | 02/053377 A1 | 7/2002 |

OTHER PUBLICATIONS

Matsuda, N., et al; Polymer Degradation and Stability, 2003, vol. 79, p. 13-20.*
International Search Report dated Jul. 28, 2015 in PCT/JP2015/062482 filed Apr. 24, 2015.
Office Action issued in European Patent Application No. 15783007.6, 6 pages.

* cited by examiner

*Primary Examiner* — Robert Stockton Jones, Jr.
(74) *Attorney, Agent, or Firm* — Oblon, McClelland, Maier & Neustadt, L.L.P.

(57) ABSTRACT

A resin composition containing an ethylene-vinylalcohol copolymer (A) and a hydroxyl group containing compound (B), the hydroxyl group containing compound (B) having a molecular weight of 200 or less, a ratio of the number of hydroxyl groups in one molecule relative to the molecular weight within a range of 0.02-0.03, and a melting point of 23° C. or higher, the content of the hydroxyl group containing compound (B) being 3-15 mass % relative to the resin composition, a molded product using the same, and a multilayer structure including a layer composed of the resin composition.

7 Claims, No Drawings

ETHYLENE-VINYLALCOHOL RESIN COMPOSITION, MOLDED PRODUCT, AND MULTILAYER STRUCTURE

TECHNICAL FIELD

The present invention relates to a resin composition which has a high oxygen barrier property, a low glass transition temperature, and a high flexibility without bleeding out of a hydroxyl group containing compound, a molded product using the same, and a multilayer structure including a layer composed of the resin composition.

BACKGROUND ART

An ethylene-vinylalcohol copolymer (EVOH resin) is a crystalline polymer having an excellent gas barrier property and an excellent organic solvent-resistant property which polyvinyl alcohol has, and thermofusion moldability and water resistance which are features of polyethylene, and is applied to an extensive range of applications. For example, EP 2 286 658 (patent document 1) discloses an example in which a plurality of types of EVOH resins are blended and applied to a film. However, the film disclosed in patent document 1 is believed to present poor extension, and is also inferior in transparency.

Furthermore, WO02/053377 (patent document 2) discloses a film in which EVOH resin serves as a base and a plasticizer is added thereto to provide a barrier layer. However, conventionally, plasticizers used for EVOH resin are propanediol, butanediol, pentanediol, propanetriol, glycerol, etc., and due to their low melting points they bleed out at high temperature/high humidity (normally, at high humidity, the motility of a chain of EVOH resin increases and accordingly, the plasticizer easily moves and thus bleeds out), resulting in impaired performance during storage.

CITATION LIST

Patent Documents

Patent Document 1: EP2 286 658
Patent Document 2: WO02/053377

SUMMARY OF INVENTION

Technical Problem

The present invention has been made to address the above issue and contemplates a resin molded product which does not cause bleedout and has a high oxygen barrier property (i.e. a low oxygen transmission rate), a low glass transition temperature, and a high flexibility, and a resin composition therefore.

Solution to Problem

The present invention is a resin composition including an ethylene-vinylalcohol copolymer (A) and a hydroxyl group containing compound (B), the hydroxyl group containing compound (B) having a molecular weight of 200 or less, a ratio of the number of hydroxyl groups in one molecule relative to the molecular weight within a range of 0.02-0.03, and a melting point of 23° C. or higher, the content of the hydroxyl group containing compound (B) being 3-15 mass % relative to the resin composition.

In the resin composition of the present invention, preferably, the hydroxyl group containing compound (B) has a melting point of 23° C. or higher and 200° C. or lower.

In the resin composition of the present invention, preferably, the hydroxyl group containing compound (B) has a ratio of the number of hydroxyl groups in one molecule relative to the molecular weight within a range of 0.021-0.025.

In the resin composition of the present invention, preferably, the hydroxyl group containing compound (B) is 1,1,1-trimethylolpropane.

In the resin composition of the present invention, preferably, the content of the hydroxyl group containing compound (B) is 5-10 mass % relative to the resin composition.

In the resin composition of the present invention, preferably, the ethylene-vinylalcohol copolymer (A) has an ethylene content in a range of 20-60 mol %.

Furthermore, the present invention also provides a molded product composed of the resin composition of the present invention described above.

Furthermore, the present invention also provides a multilayer structure including at least one layer composed of the resin composition of the present invention described above.

Advantageous Effect of Invention

The present invention can provide a resin composition which can implement a resin molded product (a molded product) which does not cause bleedout and has a high oxygen barrier property (i.e. a low oxygen transmission rate), a low glass transition temperature and high flexibility, a molded product using the same, and a multilayer structure including a layer composed of the resin composition.

DESCRIPTION OF EMBODIMENTS

<Resin Composition>

The resin composition of the present invention basically includes an ethylene-vinylalcohol copolymer (EVOH resin) (A) and a hydroxyl group containing compound (B).

(Ethylene-Vinylalcohol Copolymer (A))

The ethylene-vinylalcohol copolymer (EVOH resin) (A) used as a major component of the resin composition of the present invention is a copolymer which mainly has an ethylene unit and a vinyl alcohol unit. The EVOH (A) is obtained by saponifying a copolymer composed of ethylene and vinyl ester using an alkali catalyst etc., for example. While vinyl ester is represented by vinyl acetate, other fatty acid vinyl ester (vinyl propionate and vinyl pivalate etc.) can also be used.

Furthermore, the EVOH (A) can also copolymerize another comonomer, e.g., propylene, butylene, unsaturated carboxylic acid or an ester thereof, a vinyl silane based compound, N-vinyl pyrrolidone, etc. within a range which does not obstruct the object of the present invention.

The EVOH (A) has an ethylene content with a lower limit value preferably of 20 mol %, more preferably 25 mol %, and particularly preferably 40 mol %. The EVOH (A) has the ethylene content with an upper limit value preferably of 60 mol %, more preferably 55 mol %, particularly preferably 50 mol %. When the ethylene content is less than 20 mol %, the resin composition may have decreased melt moldability. On the contrary, when the ethylene content exceeds 60 mol %, the obtained molded product may have a decreased oxygen barrier property.

Furthermore, the EVOH (A) has a degree of saponification preferably of 90 mol % or more, more preferably 95 mol % or more, particularly preferably 99 mol % or more, from a point of view of maintaining the obtained molded product's oxygen barrier property.

The EVOH (A) has an amount of 1,2-glycol bond of preferably less than 1.8 mol %, more preferably less than 1.5 mol %, still more preferably less than 1.0 mol % from a point of view of the thermal stability at the time when the resin composition is melt-molded. The amount of 1,2-glycol bond is controlled at polymerization temperature most simply and thus preferably. For example, polymerizing at 40 to 120° C. is preferable, and polymerizing at 50 to 100° C. is more preferable. Note that the amount of 1,2-glycol bond is represented by a ratio of monomeric units contributing to the binding relative to all monomeric units.

Regarding the melt viscosity of the EVOH (A), the lower limit value of the melt flow rate (MFR) at 210° C. under a load of 2,160 g is preferably 1.0 g/10 minutes, more preferably 2.0 g/10 minutes, and the upper limit value thereof is preferably 100 g/10 minutes, more preferably 60 g/10 minutes. By using the EVOH (A) of such a melt viscosity, the melt moldability of the resin composition can further be enhanced.

The EVOH (A) can be used alone, or two or more types thereof can also be mixed and thus used.

(Hydroxyl Group Containing Compound (B))

The resin composition of the present invention is characterized by basically containing the hydroxyl group containing compound (B), the hydroxyl group containing compound (B) satisfying the following requirements:

a molecular weight of 200 or less;

a ratio of the number of hydroxyl groups in one molecule relative to the molecular weight within a range of 0.02-0.03;

a melting point of 23° C. or higher; and a content of 3-15 mass % relative to the resin composition.

Using the hydroxyl group containing compound (B) satisfying such requirements in combination with the EVOH (A) allows a resin composition to be provided that can implement a resin molded product (a molded product) having a high oxygen barrier property (i.e. a low oxygen transmission rate), free of bleedout, having a low glass transition temperature, and presenting high flexibility, as will be proved in embodiments described hereinafter. It is believed that this is because the hydroxyl group containing compound (B) satisfying the above requirements acts as a plasticizer for the EVOH (A). Although a hydroxyl group containing compound is not general as a plasticizer, it is believed that for the EVOH (A), a hydroxyl group of the hydroxyl group containing compound interacts with a hydroxyl group which the EVOH (A) has, and the hydroxyl group containing compound (B) enters between chains of the EVOH (A), and helps the chains to move, and thus acts as a plasticizer. Accordingly, a compound which thus acts on the EVOH (A) as a plasticizer is required to contain a hydroxyl group.

In the present invention, the hydroxyl group containing compound (B) having a molecular weight of 200 or less, as has been described above, is used. When a hydroxyl group containing compound having a molecular weight exceeding 200 (e.g., 1,14-tetradecanediol (molecular weight: 230), 1,16-hexadecanediol (molecular weight: 258), ditrimethylolpropane (molecular weight: 250), dipentaerythritol (molecular weight: 254), tripentaerythritol (molecular weight: 372), etc.) is used, it is poor in compatibility with the EVOH (A) and thus causes phase separation, and does not act as a plasticizer. The hydroxyl group containing compound (B) has a molecular weight preferably with a lower limit value preferably of 50, more preferably 75, and an upper limit value preferably of 180, more preferably 150, as such hydroxyl group containing compound (B) presents good compatibility with the EVOH (A) and acts as a plasticizer. Note that the molecular weight of the hydroxyl group containing compound (B) is calculated by adding each constituent element's mass number together.

Furthermore, in the present invention, the hydroxyl group containing compound (B) is used which has a ratio of the number of hydroxyl groups in one molecule relative to the molecular weight within a range of 0.02-0.03, as has been set forth above. When a hydroxyl group containing compound which has a ratio of the number of hydroxyl groups in one molecule/the molecular weight less than 0.02 (e.g., 1,5-pentanediol (ratio of the number of hydroxyl groups in one molecule/the molecular weight: 0.019), 1,6-hexanediol (ratio of the number of hydroxyl groups in one molecule/the molecular weight: 0.017), 1,7-heptanediol (ratio of the number of hydroxyl groups in one molecule/the molecular weight: 0.015), etc.) is used, an interaction between the EVOH (A) and the hydroxyl group containing compound (B) is reduced and the hydroxyl group containing compound is not sufficiently effective as a plasticizer and the obtained resin composition has an increased glass transformation temperature or the obtained molded product has an increased tensile modulus of elasticity disadvantageously. Furthermore, in some cases, it is not sufficiently compatible with the EVOH (A), resulting in inferior tensile elongation at break, an inferior oxygen transmission rate (OTR), and the obtained molded product having an appearance with spots disadvantageously. Furthermore, when a hydroxyl group containing compound having a ratio of the number of hydroxyl groups in one molecule/the molecular weight exceeding 0.03 (e.g., 1,2,3-propanetriol (ratio of the number of hydroxyl groups in one molecule/the molecular weight: 0.033), erythritol (ratio of the number of hydroxyl groups in one molecule/the molecular weight: 0.033) etc.) is used, the hydroxyl group containing compound (B) inhibits crystallization of the EVOH (A) and the obtained molded product has an inferior oxygen transmission rate. Furthermore, the obtained molded product easily absorbs moisture and consequently, the hydroxyl group containing compound (B) is enhanced in motility in the molded product, resulting in bleedout at high humidity disadvantageously. The ratio of the number of hydroxyl groups in one molecule/the molecular weight preferably has a lower limit value preferably of 0.021, more preferably 0.022, and an upper limit value preferably of 0.025, more preferably 0.023, as such values allow a molded product to be obtained which has a low oxygen transmission rate, a low glass transformation temperature and high flexibility.

Furthermore, in the present invention, the hydroxyl group containing compound (B) having a melting point (Tm) of 23° C. or higher is used. When a hydroxyl group containing compound having a melting point (Tm) less than 23° C. (e.g., 1,2-propylene glycol (melting point: −59° C.), 1,4-propylene glycol (melting point: −27° C.), 1,4-butanediol (melting point: 20° C.), 1,5-pentanediol (melting point: −18° C.) etc.) is used, the obtained molded product causes bleedout disadvantageously. Furthermore, when a hydroxyl group containing compound having a melting point which is low to some extent is mixed with the EVOH (A), the hydroxyl group containing compound is believed to have a strong effect to enhance the EVOH chains in motility, and accordingly the hydroxyl group containing compound (B) has a melting point preferably with an upper limit value of 200° C., more preferably 100° C. Note that the melting point of the hydroxyl group containing compound (B) indicates a value measured in a method in conformity with JIS K0064.

Furthermore, the hydroxyl group containing compound (B) of the present invention has a content in a range of 3-15 mass % relative to the resin composition. When the hydroxyl group containing compound (B) of the present invention has a content of 3 mass % or less relative to the resin composition, it does not have a sufficient effect as a plasticizer, resulting in an increased glass transformation temperature, the obtained molded product having an increased tensile modulus of elasticity at room air temperature, and the like disadvantageously. Furthermore, when the hydroxyl group containing compound (B) has a content exceeding 15 mass % relative to the resin composition, the obtained molded product has an inferior oxygen transmission rate, and, for some cases, inferior tensile elongation at break, and the like disadvantageously. The hydroxyl group containing compound (B) has a content with a lower limit value preferably of 4 mass %, more preferably 5 mass % relative to the resin composition, and an upper limit value preferably of 10 mass %, more preferably 8 mass % relative to the resin composition, as such values allow the hydroxyl group containing compound to exhibit a sufficient effect as a plasticizer, a resin composition having a low glass transformation temperature to be obtained, and a molded product having high flexibility and a low oxygen transmission rate to be obtained.

As the hydroxyl group containing compound (B) having the molecular weight, the ratio of the number of hydroxyl groups in one molecule/the molecular weight, and the melting point, as described above, for example 1,1,1-trimethylolpropane, 1,1,1-trimethylolethane, trimethylolmethane, tetramethylolmethane (pentaerythritol), etc. can be referred to. Inter alia, 1,1,1-trimethylolpropane and 1,1,1-trimethylolethane are preferable, and 1,1,1-trimethylolpropane is more preferable, as they allow a molded product having a low glass transformation temperature and high flexibility to be obtained and a low oxygen transmission rate to be maintained.

To the resin composition of the present invention, other than the EVOH (A) and the hydroxyl group containing compound (B), a known additive generally blended with the EVOH (A), e.g., the thermostabilizer, an antioxidant, an antistatic agent, a colorant, an ultraviolet absorber, a lubricant, a plasticizer, a photostabilizer, a surfactant, an antibacterial agent, a desiccating agent, an anti blocking agent, a fire retardant, a crosslinking agent, a curing agent, a foaming agent, a nucleus agent, an anticlouding agent, a biodegrading additive, a silane coupling agent, an oxygen absorbent, etc. may be added within a range which does not inhibit the effect of the present invention.

The resin composition of the present invention has a glass transformation temperature (Tg) with a lower limit value preferably of 10° C., more preferably 20° C., and an upper limit value preferably of 50° C., more preferably 40° C. When the resin composition has a glass transformation temperature less than 10° C., the obtained molded product has a tendency to have a high oxygen transmission rate, whereas when the resin composition has a glass transformation temperature exceeding 50° C., the obtained molded product has a tendency to have low flexibility.

Furthermore, the resin composition of the present invention has a melting point (Tm) with a lower limit value preferably of 100° C., more preferably 120° C. and an upper limit value preferably of 200° C., more preferably 180° C. as such values facilitate melt-molding.

<Resin Molded Product (Molded Product)>

Furthermore, the present invention also provides a molded product composed of the above described resin composition. The molded product of the present invention has a nature such that it has a high oxygen barrier property (or a low oxygen transmission rate), does not cause bleedout, has a low glass transition temperature, and presents high flexibility.

The fact that it does not cause bleedout can be confirmed at 40° C. and 100% RH.

The molded product of the present invention, in the form of a 20 μm single layer of film, as measured in conformity with a provision of JIS K 7161, has a tensile modulus of elasticity (at 23° C., 50% RH, MD/TD) with a lower limit value preferably of 100 MPa and an upper limit value preferably of 2,000 MPa, more preferably 1,000 MPa.

The molded product of the present invention, in the form of a 100 μm single layer of film, as measured in conformity with a provision of JIS K 7161, has a tensile strength at break (at 23° C., 50% RH, MD/TD) with a lower limit value preferably of 20 MPa and an upper limit value preferably of 40 MPa.

Furthermore, the molded product of the present invention, in the form of a 100 μm single layer of film, as measured in conformity with a provision of JIS K 7161, has a tensile elongation at break (at 23° C., 50% RH, MD/TD) with a lower limit value preferably of 100% and an upper limit value preferably of 500%.

Furthermore, the molded product of the present invention, in the form of a 20 μm single layer of film, as measured in conformity with a provision of JIS Z 1707, has a piercing strength (at 23° C., 50% RH) with a lower limit value preferably of 3 N and an upper limit value preferably of 5.0 N.

It is better that the molded product of the present invention has smaller oxygen transmission rates (OTR), as measured in conformity with a provision of ISO 14663-2, (at 20° C., 85% RH), with an upper limit value preferably of 50 cc·20 μm/m$^2$/day/atm, more preferably 30 cc·20 μm/m$^2$/day/atm.

The molded product of the present invention can be produced by mixing each component by a known method such as a melt mixing method, a solution mixing method, and a mechanical mixing method, and molding the same in a known method. For example, the melt mixing method can be a method which dry-blends each component and subsequently melts and thus mixes them together, e.g., it can be done using a known melting and kneading apparatus such as a kneader ruder, an extruder, a roll mill, a Banbury mixer, a plastomill, however, normally, it is industrially preferable to use a single or twin screw extruder, and if necessary, it is also preferable to provide a vent suction device, a gear pump device, a screen device and the like. As the solution mixing method is referred to a method for example of solving each component in a common good solvent and thus mixing them together, and precipitating the same in a common poor solvent, etc. The resin mixed in the melt mixing method or the solution mixing method can be used for example in a powdery form, a spherical, cylindrical or a similar pelletized form, a flaky form or the like.

<Multilayer Structure>

The present invention also provides a multilayer structure including at least one layer composed of the resin composition of the present invention described above. The layer composed of the resin composition of the present invention in the multilayer structure of the present invention preferably has a tensile modulus of elasticity, a tensile strength at break, a tensile elongation at break, a piercing strength, and an oxygen transmission rate which are similar to those of the molded product of the present invention as described above.

A resin configuring the multilayer structure that is used as a layer other than the resin composition layer is not limited to any particular resin, however, a hydrophobic thermoplastic resin is referred to prevent moisture from reducing the resin composition's gas barrier performance. For example, more specifically, polyolefin based resin: linear low density polyethylene, low density polyethylene, ultra low density polyethylene, ultra low density linear polyethylene, medium density polyethylene, high density polyethylene or other similar polyethylenes, and an ethylene-α olefin copolymer or a similar polyethylene based resin, polypropylene, an ethylene-propylene (block and random) copolymer, a propylene-α olefin (α olefin of a carbon number of 4-20) copolymer or a similar polypropylene based resin, polybutene, polypentene, etc.; a grafted polyolefin which is these polyolefins graft-modified with unsaturated carboxylic acid or an ester thereof, cyclic polyolefin based resin; an ionomer, an ethylene-vinylacetate copolymer, an ethylene-acrylic acid copolymer, an ethylene-acrylic ester copolymer, polyester based resin, polyamide based resin, polyvinyl chloride, polyvinylidene chloride, acrylic resin, polystyrene, vinyl ester based resin, polyester elastomer, polyurethane elastomer, chlorinated polyethylene, chlorinated polypropylene or similar halogenated polyolefin, aromatic or aliphatic polyketone, etc. are referred to. Inter alia, in terms of mechanical strength and molding workability, it is preferably polyolefin based resin, and particularly preferably polyethylene and polypropylene.

Furthermore, other than these resins, it may be a multilayer structure combined with paper, metallic foil, mono axially or biaxially stretched plastic film or sheet, woven fabric, nonwoven fabric, metal filament, woody plane, aluminum or silica vapor deposition and/or the like.

As a layer structure of the multilayer structure, when a layer obtained from the resin composition of the present invention is represented as F, a layer obtained from the hydrophobic thermoplastic resin is represented as A, and a layer obtained from a hydrophobic thermoplastic resin modified with unsaturated carboxylic acid or a derivative thereof is represented as MA, the following layer configuration can be illustrated. In the layer configuration, a more leftward layer is an outer layer (a layer closer to a side exposed to an external environment). Layer MA composed of the hydrophobic thermoplastic resin modified with unsaturated carboxylic acid or a derivative thereof is also used as an adhesive resin layer as well as an outer layer.

two layers: MA/F three layers: A/MA/F, MA/F/MA, F/MA/F four layers: A/MA/F/MA, MA/F/MA/F five layers: F/MA/A/MA/F, A/MA/F/MA/A

MA/F/MA/F/MA, A/MA/F/MA/F six layers: A/MA/F/MA/A/MA seven layers: A/MA/F/MA/F/MA/A The method of producing the multilayer structure of the present invention is generally classified into a method to mold the resin composition in a molten state (a melt molding method) and a method to solve the resin composition in a solvent and thus mold the resin composition (e.g., a solution coating method). Inter alia, in view of productivity, the melt molding method is preferable.

EXAMPLES

Hereinafter, the present invention will further be described in examples, however, the present invention should not be limited thereto at all.

Note that obtained resin compositions were assessed in the following method. Furthermore, a melting and kneading condition and a film forming condition are indicated below.

[Ethylene Content and Degree of Saponification of EVOH (A)]

They were obtained through $^1$H-NMR measurement (measurement device: JEOL JNM-GX-500 type) with DMSO-$d_6$ used as a solvent.

[Amount of 1,2-glycol Bond of EVOH (A)]

It was obtained through $^1$H-NMR measurement (measurement device: JEOL JNM-GX-500 type) with DMSO-$d_6$ used as a solvent.

[Melt Flow Rate (MFR)]

Using a melt indexer (L244 produced by Takarakogyo), a sample's outflow velocity (g/10 minutes) was measured at a temperature of 210° C. under a load of 2,160 g.

[Melting Point (Tm) and Glass Transition Temperature (Tg)]

In conformity with JIS K 7121, and using a differential scanning calorimeter (DSC) (Q2000 produced by TA Instrument), melting point (Tm) and glass transition temperature (Tg) were obtained.

[Melting and Kneading Condition]

The EVOH (A) and the hydroxyl group containing compound (B) were mixed together and subsequently molten and kneaded, pelletized, dried under the following conditions to obtain a pellet of the resin composition.

Equipment: 26 mmφ twin screw extruder (laboplastomill 15C300 produced by Toyo Seiki Seisaku-syo, Ltd.)

L/D: 25

Screw: an equi-directional complete meshing type

Number of dice holes: two holes (3 mmφ)

Extrusion temperature (° C.): C1=200, C2-C5=230, Die=230 rate of rotation: 100 rpm

Amount discharged: approximately 5 kg/hr

Drying: dried with hot air at 80° C. for 6 hrs

[Conditions for Producing Single Layer of Film (Molded Product)]

The obtained resin composition was formed in a film under the following conditions to obtain a single layer of film (a molded product) of 20 μm and 100 μm in thickness.

Equipment: 20 mmφ single screw extruder (laboplastomill 15C300 produced by Toyo Seiki Seisaku-syo, Ltd.)

L/D: 20

Screw: full flight

Die: 300 mm coat hanger die

Extrusion temperature (° C.):C1=180, C2-C3=200, Die=200

Screen: 50/100/50

Chill roll temperature: 20° C.

Rate of Rotation: 40 rpm (when forming a film having a thickness of 20 μm), 100 rpm (when forming a film having a thickness of 100 μm)

Take up rate: 3.0-3.5 m/minute (when forming the film having the thickness of 20 μm), 1.5-1.75 m/minute (when forming the film having the thickness of 100 μm).

[Tensile Modulus of Elasticity]

In conformity to JIS K 7161, the obtained 20 μm thick single layer of film was adjusted in humidity at 23° C./50%

RH, and subsequently, it was cut into a strip of 15 mm in width and 12 cm in length, and AUTOGRAPH AGS-H (produced by Shimadzu Corporation) was used to obtain measurement for MD and TD with an inter-chuck distance of 50 mm and a pulling speed of 5 mm/minute to use it as an index of flexibility.

[Tensile Strength at Break and Tensile Elongation at Break]

In conformity to JIS K 7161, the obtained 100 μm thick single layer of film was adjusted in humidity at 23° C./50% RH, and subsequently, it was cut into a strip of 15 mm in width and 12 cm in length, and AUTOGRAPH AGS-H (produced by Shimadzu Corporation) was used to obtain measurement for MD and TD with an inter-chuck distance of 50 mm and a pulling speed of 500 mm/minute.

[Piercing Strength]

In conformity to JIS Z 1707, the obtained 20 μm thick single layer of film was adjusted in humidity at 23° C./50% RH, and subsequently, it was cut into a circle of 10 cm in diameter, and a jig was used to fix a test piece, and AUTOGRAPH AGS-H (produced by Shimadzu Corporation) was used to stick the test piece with a needle having a diameter of 1.0 mm and a tip having a semicircular shape having a radius of 0.5 mm at a rate of 50 mm/minute to measure a maximum stress until the needle pierces it.

[Oxygen Transmission Rate (OTR)]

The obtained 20 μm thick single layer of film was adjusted in humidity at 20° C./85% RH, and subsequently, in conformity to ISO14663-2, an oxygen transmission rate measuring device (OX-Tran2/20 produced by Modern Control) was used to measure an oxygen transmission rate (OTR) at 20° C./85% RH.

[Bleedout]

The obtained single layer of film having a thickness of 20 μm was stored for seven days at 40° C./100% RH, and visual observation and a Fourier transform infrared spectrophotometer (Spectrum One produced by Perkin Elmer) were employed to measure an infrared absorption spectrum in a mode of ATR (total reflection measurement) to examine bleedout of the hydroxyl group containing compound (B) to make a decision as below:

X: Bleedout did not occur.
Y: Bleed out occurred.

Example 1

90 mass % of an EVOH resin having an ethylene content of 44 mol %, a degree of saponification equal to or greater than 99 mol %, an MFR of 5.7 g/10 minutes (at 210° C. under a load of 2,160 g), and 1,2-glycol bond in an amount of 0.46 mol % (hereinafter also referred to as "A1"), and 10 mass % of a hydroxyl group containing compound of 1,1,1-trimethylolpropane (molecular weight: 134, number of hydroxyl groups: 3, ratio of the number of hydroxyl groups in one molecule/the molecular weight: 0.022, melting point: 58° C.) (hereinafter also referred to as "TMP") were mixed together and by the above method a twin screw extruder was used to melt and knead, and thus pelletized the mixture, which was in turn dried with a hot air dryer at 80° C. for 6 hrs to obtain a resin composition. Subsequently, using the obtained resin composition, by the above described method, a single screw extruder was used to produce a single layer of film (a molded product) of 20 μm and 100 μm. The obtained resin composition's glass transformation temperature was measured in the above described method. Furthermore, the obtained molded product's tensile modulus of elasticity, tensile strength at break, tensile elongation at break, piercing strength, oxygen transmission rate (OTR), and presence/absence of bleedout were measured in the above described method. The result is shown in table 1.

Example 2

A resin composition and a molded product were obtained similarly as done in example 1 except that instead A1 was used an EVOH resin having an ethylene content of 32 mol %, a degree of saponification equal to or greater than 99 mol %, an MFR of 4.4 g/10 minutes (at 210° C. under a load of 2,160 g), and 1,2-glycol bond in an amount of 0.73 mol % (hereinafter also referred to as "A2"). The obtained resin composition and molded product were assessed similarly as done in example 1, and the result thereof is shown in table 1.

Example 3

A resin composition and a molded product were obtained similarly as done in example 1 except that the mixing was done at a ratio of 85 mass % of the EVOH resin and 15 mass % of the hydroxyl group containing compound. The obtained resin composition and molded product were assessed similarly as done in example 1, and the result thereof is shown in table 1.

Example 4

A resin composition and a molded product were obtained similarly as done in example 1 except that the mixing was done at a ratio of 93 mass % of the EVOH resin and 7 mass % of the hydroxyl group containing compound. The obtained resin composition and molded product were assessed similarly as done in example 1, and the result thereof is shown in table 1.

Example 5

A resin composition and a molded product were obtained similarly as done in example 1 except that the mixing was done at a ratio of 97 mass % of the EVOH resin and 3 mass % of the hydroxyl group containing compound. The obtained resin composition and molded product were assessed similarly as done in example 1, and the result thereof is shown in table 1.

Example 6

A resin composition and a molded product were obtained similarly as done in example 1 except that instead TMP was used a hydroxyl group containing compound of 1,1,1-trimethylolethane (molecular weight: 120, number of hydroxyl groups: 3, ratio of the number of hydroxyl groups in one molecule/the molecular weight: 0.025, melting point: 193° C.) (hereinafter also referred to as "TME"). The obtained resin composition and molded product were assessed similarly as done in example 1, and the result thereof is shown in table 1.

Example 7

A resin composition and a molded product were obtained similarly as done in example 1 except that instead TMP was used a hydroxyl group containing compound of tetramethylolmethane (pentaerythritol) (molecular weight: 136, number of hydroxyl groups: 4, ratio of the number of hydroxyl groups in one molecule/the molecular weight: 0.029, melting point: 261° C.) (hereinafter also referred to as "TeMM"). The obtained resin composition and molded product were assessed similarly as done in example 1, and the result thereof is shown in table 1.

Example 8

A resin composition and a molded product were obtained similarly as done in example 1 except that instead A1 was used an EVOH resin having an ethylene content of 44 mol %, a degree of saponification equal to or greater than 99 mol %, an MFR of 3.3 g/10 minutes (at 210° C. under a load of 2,160 g), and 1,2-glycol bond in an amount of 0.49 mol % (hereinafter also referred to as "A3"). The obtained resin composition and molded product were assessed similarly as done in example 1, and the result thereof is shown in table 2.

Example 9

A resin composition and a molded product were obtained similarly as done in example 1 except that instead A1 was used an EVOH resin having an ethylene content of 32 mol %, a degree of saponification equal to or greater than 99 mol %, an MFR of 3.7 g/10 minutes (at 210° C. under a load of 2,160 g), and 1,2-glycol bond in an amount of 0.71 mol % (hereinafter also referred to as "A4"). The obtained resin composition and molded product were assessed similarly as done in example 1, and the result thereof is shown in table 2.

Example 10

A resin composition and a molded product were obtained similarly as done in example 8 except that the mixing was done at a ratio of 85 mass % of the EVOH resin and 15 mass % of the hydroxyl group containing compound. The obtained resin composition and molded product were assessed similarly as done in example 1, and the result thereof is shown in table 2

Example 11

A resin composition and a molded product were obtained similarly as done in example 8 except that the mixing was done at a ratio of 93 mass % of the EVOH resin and 7 mass % of the hydroxyl group containing compound. The obtained resin composition and molded product were assessed similarly as done in example 1, and the result thereof is shown in table 2.

Example 12

A resin composition and a molded product were obtained similarly as done in example 8 except that the mixing was done at a ratio of 97 mass % of the EVOH resin and 3 mass % of the hydroxyl group containing compound. The obtained resin composition and molded product were assessed similarly as done in example 1, and the result thereof is shown in table 2.

Example 13

A resin composition and a molded product were obtained similarly as done in example 8 except that instead of TMP, a hydroxyl group containing compound of TME was used. The obtained resin composition and molded product were assessed similarly as done in example 1, and the result thereof is shown in table 2.

Example 14

A resin composition and a molded product were obtained similarly as done in example 8 except that instead of TMP, a hydroxyl group containing compound of TeMM was used. The obtained resin composition and molded product were assessed similarly as done in example 1, and the result thereof is shown in table 2.

Comparative Example 1

A resin composition and a molded product were obtained similarly as done in example 1 except that a hydroxyl group containing compound was not mixed. The obtained resin composition and molded product were assessed, similarly as done in example 1, except for presence/absence of bleedout, and the result thereof is shown in table 3

Comparative Example 2

A resin composition and a molded product were obtained similarly as done in example 2 except that a hydroxyl group containing compound was not mixed. The obtained resin composition and molded product were assessed, similarly as done in example 1, except for presence/absence of bleedout, and the result thereof is shown in table 3.

Comparative Example 3

A resin composition and a molded product were obtained similarly as done in example 1 except that the mixing was done at a ratio of 80 mass % of the EVOH resin and 20 mass % of the hydroxyl group containing compound. The obtained resin composition and molded product were assessed similarly as done in example 1, and the result thereof is shown in table 3.

Comparative Example 4

A resin composition and a molded product were obtained similarly as done in example 1 except that the mixing was done at a ratio of 98 mass % of the EVOH resin and 2 mass % of the hydroxyl group containing compound. The obtained resin composition and molded product were assessed similarly as done in example 1, and the result thereof is shown in table 3.

Comparative Example 5

A resin composition and a molded product were obtained similarly as done in example 1 except that instead TMP was used a hydroxyl group containing compound of 1,2-propylene glycol (molecular weight: 76, number of hydroxyl groups: 2, ratio of the number of hydroxyl groups in one molecule/the molecular weight: 0.026, melting point: −59° C.) (hereinafter also referred to as "PPG"). The obtained resin composition and molded product were assessed similarly as done in example 1, and the result thereof is shown in table 3.

Comparative Example 6

A resin composition and a molded product were obtained similarly as done in example 1 except that instead of TMP was used a hydroxyl group containing compound of 1,5-pentanediol (molecular weight: 104, number of hydroxyl groups: 2, ratio of the number of hydroxyl groups in one molecule/the molecular weight: 0.019, melting point: −18° C.) (hereinafter also referred to as "PeDO"). The obtained resin composition and molded product were assessed similarly as done in example 1, and the result thereof is shown in table 3.

Comparative Example 7

A resin composition and a molded product were obtained similarly as done in example 1 except that instead TMP was used a hydroxyl group containing compound of 1,6-hexanediol (molecular weight: 118, number of hydroxyl groups: 2, ratio of the number of hydroxyl groups in one molecule/the molecular weight: 0.017, melting point: 42° C.) (hereinafter also referred to as "HDO"). The obtained resin composition and molded product were assessed similarly as done in example 1, and the result thereof is shown in table 3.

Comparative Example 8

A resin composition and a molded product were obtained similarly as done in example 1 except that instead TMP was used a hydroxyl group containing compound of 1,2,3-propanetriol (molecular weight: 92, number of hydroxyl groups: 3, ratio of the number of hydroxyl groups in one molecule/the molecular weight: 0.033, melting point: 18° C.) (hereinafter also referred to as "PrTO"). The obtained resin composition and molded product were assessed similarly as done in example 1, and the result thereof is shown in table 3.

Comparative Example 9

A resin composition and a molded product were obtained similarly as done in example 1 except that instead TMP was used a hydroxyl group containing compound of 1,4-butanediol (molecular weight: 90, number of hydroxyl groups: 2, ratio of the number of hydroxyl groups in one molecule/the molecular weight: 0.022, melting point: 20° C.) (hereinafter also referred to as "BDO"). The obtained resin composition and molded product were assessed similarly as done in example 1, and the result thereof is shown in table 3.

TABLE 1

| | | Example 1 | Example 2 | Example 3 | Example 4 | Example 5 | Example 6 | Example 7 |
|---|---|---|---|---|---|---|---|---|
| A: ethylene-vinylalcohol copolymer | | A1 | A2 | A1 | A1 | A1 | A1 | A1 |
| B: hydroxyl group containing, low molecular weight compound | type | TMP | TMP | TMP | TMP | TMP | TME | TeMM |
| | molecular weight | 134 | 134 | 134 | 134 | 134 | 120 | 136 |
| | no. of hydroxyl groups | 3 | 3 | 3 | 3 | 3 | 3 | 4 |
| | ratio of no. of hydroxyl groups in one molecule/molecular weight | 0.022 | 0.022 | 0.022 | 0.022 | 0.022 | 0.025 | 0.029 |
| | melting point (° C.) | 58 | 58 | 58 | 58 | 58 | 193 | 261 |
| A/B (mass %/mass %) | | 90/10 | 90/10 | 85/15 | 93/7 | 97/3 | 90/10 | 90/10 |
| glass transformation temperature (Tg) | (° C.) | 21 | 27 | 19 | 29 | 37 | 16 | 18 |
| melting point (Tm) | (° C.) | 152 | 165 | 151 | 156 | 158 | 150 | 149 |
| tensile modulus of elasticity 23 degC/50% RH | MD (MPa) | 330 | 900 | 250 | 500 | 800 | 240 | 210 |
| | TD (MPa) | 410 | 800 | 300 | 540 | 840 | 290 | 270 |
| tensile strength at break 23 degC/50% RH | MD (MPa) | 30 | 30 | 25 | 25 | 30 | 30 | 25 |
| | TD (MPa) | 25 | 30 | 25 | 30 | 25 | 25 | 30 |
| tensile elongation at break 23 degC/50% RH | MD (%) | 400 | 340 | 400 | 360 | 340 | 400 | 410 |
| | TD (%) | 380 | 330 | 390 | 340 | 320 | 380 | 390 |
| piercing strength 23 degC/50% RH | (N) | 4.1 | 3.8 | 3.9 | 4.2 | 4.8 | 3.9 | 3.9 |
| OTR 20 degC/85% RH | (cc · 20 μm/m$^2$/day/atm) | 13.2 | 3.1 | 21.2 | 9.9 | 6.8 | 22.1 | 24.2 |
| bleedout 40 degC/100% RH | | X | X | X | X | X | X | X |

TABLE 2

| A: ethylene-vinylalcohol copolymer | | Example 8 A3 | Example 9 A4 | Example 10 A3 | Example 11 A3 | Example 12 A3 | Example 13 A3 | Example 14 A3 |
|---|---|---|---|---|---|---|---|---|
| B: hydroxyl group containing, low molecular weight compound | type | TMP | TMP | TMP | TMP | TMP | TME | TeMM |
| | molecular weight | 134 | 134 | 134 | 134 | 134 | 120 | 136 |
| | no. of hydroxyl groups | 3 | 3 | 3 | 3 | 3 | 3 | 4 |
| | ratio of no. of hydroxyl groups in one molecule/ molecular weight | 0.022 | 0.022 | 0.022 | 0.022 | 0.022 | 0.025 | 0.029 |
| | melting point (° C.) | 58 | 58 | 58 | 58 | 58 | 193 | 261 |
| A/B (mass %/mass %) | | 90/10 | 90/10 | 85/15 | 93/7 | 97/3 | 90/10 | 90/10 |
| glass transformation temperature (Tg) | (° C.) | 20 | 28 | 20 | 28 | 38 | 17 | 18 |
| melting point (Tm) | (° C.) | 151 | 166 | 150 | 155 | 158 | 149 | 147 |
| tensile modulus of elasticity 23 degC/50% RH | MD (MPa) | 340 | 910 | 260 | 510 | 790 | 230 | 200 |
| | TD (MPa) | 400 | 790 | 300 | 530 | 850 | 280 | 260 |
| tensile strength at break 23 degC/50% RH | MD (MPa) | 30 | 30 | 25 | 25 | 30 | 30 | 25 |
| | TD (MPa) | 25 | 25 | 25 | 30 | 30 | 25 | 30 |
| tensile elongation at break 23 degC/50% RH | MD (%) | 410 | 350 | 410 | 360 | 350 | 410 | 400 |
| | TD (%) | 370 | 330 | 380 | 340 | 320 | 380 | 380 |
| piercing strength 23 degC/50% RH | (N) | 4.0 | 3.7 | 3.9 | 4.3 | 4.7 | 3.8 | 3.9 |
| OTR 20 degC/85% RH | (cc · 20 μm/m$^2$/day/atm) | 13.0 | 2.9 | 21.4 | 9.6 | 6.4 | 22.0 | 23.9 |
| bleedout 40 degC/100% RH | | X | X | X | X | X | X | X |

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| A: ethylene-vinylalcohol copolymer | | A1 | A2 | A1 | A1 | A1 | A1 | A1 | A1 | A1 |
| B: hydroxyl group containing, low molecular compound | type | — | — | TMP | TMP | PPG | PeDO | HDO | PrTO | BDO |
| | molecular weight | — | — | 134 | 134 | 76 | 104 | 118 | 92 | 90 |
| | no. of hydroxyl groups | — | — | 3 | 3 | 2 | 2 | 2 | 3 | 2 |
| | ratio of no. of hydroxyl groups in one molecule/ molecular weight | — | — | 0.022 | 0.022 | 0.026 | 0.019 | 0.017 | 0.033 | 0.022 |
| | melting point (° C.) | — | — | 58 | 58 | −59 | −18 | 42 | 18 | 20 |
| A/B (mass %/mass %) | | — | — | 80/20 | 98/2 | 90/10 | 90/10 | 90/10 | 90/10 | 90/10 |
| glass transformation temperature (Tg) | (° C.) | 52 | 57 | 19 | 41 | 20 | 48 | 45 | 14 | 36 |
| melting point (Tm) | (° C.) | 165 | 183 | 151 | 159 | 150 | 160 | 162 | 160 | 155 |
| tensile modulus of elasticity 23 degC/50% RH | MD (MPa) | 1200 | 2100 | 220 | 1000 | 300 | 560 | 600 | 210 | 480 |
| | TD (MPa) | 1100 | 1700 | 280 | 900 | 420 | 600 | 820 | 260 | 500 |
| tensile strength at break 23 degC/50% RH | MD (MPa) | 35 | 40 | 25 | 30 | 30 | 35 | 35 | 30 | 35 |
| | TD (MPa) | 25 | 35 | 25 | 30 | 25 | 25 | 25 | 25 | 25 |
| tensile elongation at break 23 degC/50% RH | MD (%) | 250 | 40 | 400 | 290 | 410 | 340 | 350 | 410 | 360 |
| | TD (%) | 290 | 40 | 280 | 300 | 400 | 280 | 210 | 420 | 320 |
| piercing strength 23 degC/50% RH | (N) | 4.9 | 4.4 | 3.6 | 4.8 | 4.1 | 3.4 | 3.2 | 3.8 | 3.7 |
| OTR 20 degC/85% RH | (cc · 20 μm/m$^2$/day/atm) | 5.1 | 1.9 | 34.2 | 6.2 | 21.1 | 49.2 | 21.7 | 33.2 | 30.2 |
| bleedout 40 degC/100% RH | | — | — | X | X | Y | Y | Y | Y | Y |

It should be understood that the embodiments and examples disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

The invention claimed is:

1. A resin composition consisting essentially of an ethylene-vinylalcohol copolymer (A) and a hydroxyl group containing compound (B), wherein:
the hydroxyl group containing compound (B) has a molecular weight of 200 or less, a ratio of a number of hydroxyl groups in one molecule relative to the molecular weight within a range of 0.02-0.03, and a melting point of 23° C. or higher and 200° C. or lower; and a content of the hydroxyl group containing compound (B) is 3-15 mass % relative to a total mass of the resin composition.

2. The resin composition according to claim 1, wherein the hydroxyl group containing compound (B) has the ratio of the number of hydroxyl groups in one molecule relative to the molecular weight within a range of 0.021-0.025.

3. The resin composition according to claim 1, wherein the hydroxyl group containing compound (B) is 1,1,1-trimethylolpropane.

4. The resin composition according to claim 1, wherein the content of the hydroxyl group containing compound (B) is 5-10 mass % relative to the resin composition.

5. The resin composition according to claim 1, wherein the ethylene-vinylalcohol copolymer (A) has an ethylene content in a range of 20-60 mol %.

6. A molded product, comprising the resin composition of claim 1.

7. A multilayer structure, comprising at least one layer comprising the resin composition according to claim 1.

* * * * *